Figure 3:
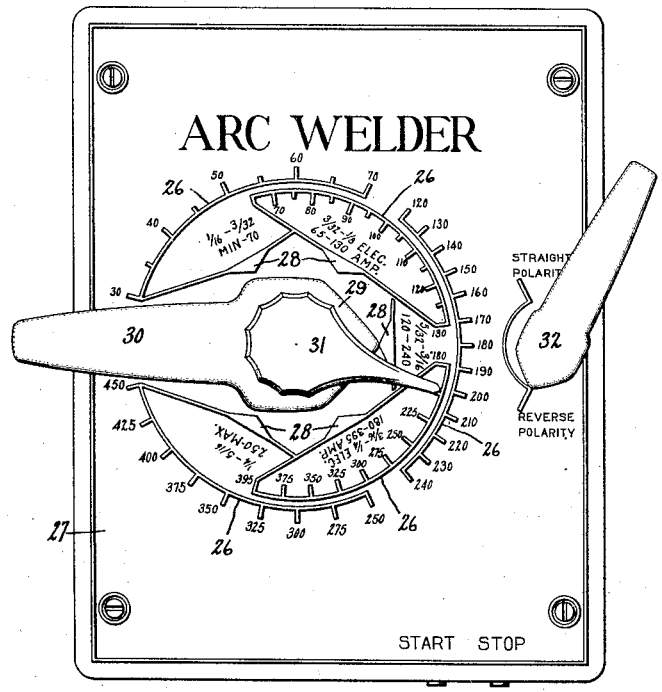

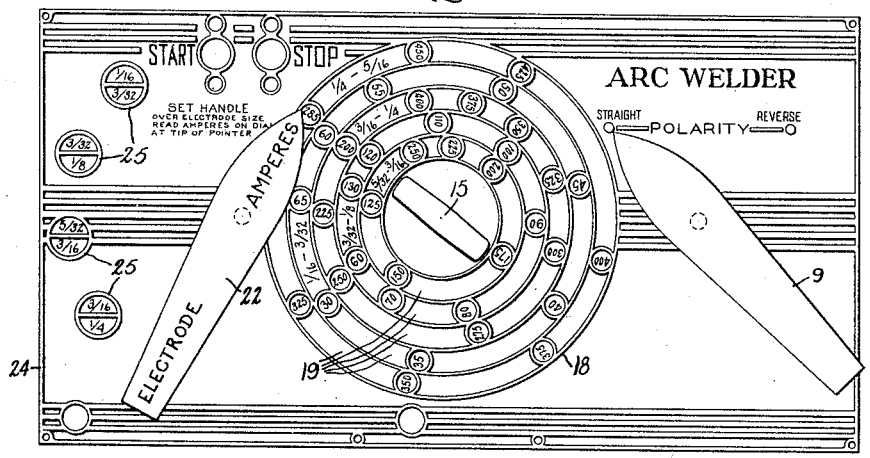

May 11, 1948.    R. C. FREEMAN ET AL    2,441,406
INDICATING APPARATUS
Filed June 27, 1944    2 Sheets-Sheet 2

Inventors:
Raymond C. Freeman,
Richard F. Wyer,
by Harry E. Dunham
Their Attorney.

Patented May 11, 1948

2,441,406

UNITED STATES PATENT OFFICE 2,441,406

INDICATING APPARATUS

Raymond C. Freeman, Marblehead, Mass., and Richard F. Wyer, Rexford, N. Y., assignors to General Electric Company, a corporation of New York Application June 27, 1944, Serial No. 542,390

5 Claims. (Cl. 219—8)

1

Our invention relates to improved apparatus for presetting the current output of a generator whose characteristics are dependent upon the combined adjustment of a plurality of control elements which are independently movable and mutually effective in determining the operating characteristics of the generator.

In accordance with our invention a generator controller is provided with scale and pointer means which is operated by the independent adjustments of a plurality of elements of the controller to indicate to the operator the selection of one of a plurality of generator current output ranges determined by an adjustment of one of the generator control elements and the selection of a particular generator current output value determined for any selected current output range by an adjustment of another of the generator control elements.

Generators having two independently adjusted and mutually effective excitation controls are well known in the art and are frequently referred to as dual control generators. These generators may be employed as arc welding generators when they have operating characteristics which particularly suit them for supplying current to an arc employed in forming welds on or between parts in accordance with a desired welding procedure. The wide range of current adjustments obtainable with such generators is highly desirable for the variety of arc welding conditions determined by the mutually dependent factors of work size, electrode size, welding current, heat and the like employed in performing each different welding operation.

In dual control arc welding generators this wide range of current adjustment may be obtained by controlling, electrically or magnetically, the effective flux of the generator's fields. For example, the output ranges of the generator may be determined by a series field adjustment and the current value in each output range thereafter determined by a shunt field adjustment. It is highly desirable to correlate these two adjustments by means of a suitable indicator so that the welding operator may preset the generator for the welding operation he is about to perform.

It is an object of our invention to provide a generator control in which the range of current values and the current value in a selected range are indicated by the operation of control handles used in making these adjustments.

It is a further object of our invention to provide a dual control generator with indicator means operated by movement of the handles of the generator controller to register on a single dial current output ranges in accordance with electrode size, or some other welding factor depending on current output range, and the selection of a preset current value in any current output range.

It is also an object of our invention to provide a dual control arc welding generator with an indicator having scales graduated in current values for electrode size and having pointer means for indicating on said scales the effect of the adjustments of the dual controls of the generator so that the welding operator by reference to the indicator may select current output ranges in accordance with electrode size and preset the current to be delivered in any range selected in accordance with electrode size.

Further objects of our invention will become apparent from a consideration of the following description of two embodiments of our invention illustrated in the accompanying drawings.

Figure 4:
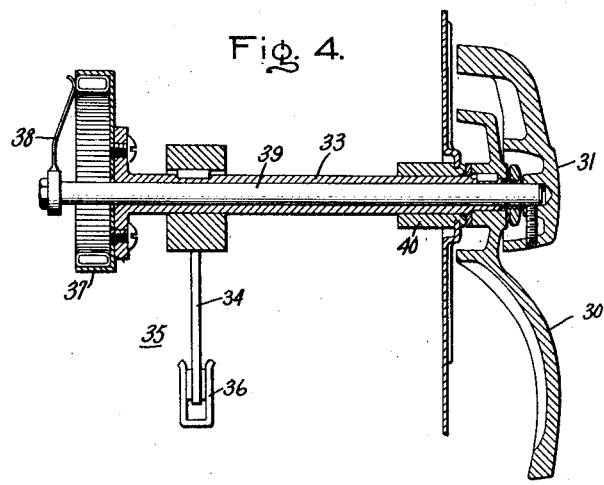

In these drawings, Fig. 1 is a front view of the indicator of a controller embodying our invention and Fig. 2 is a diagrammatic view illustrating the manner in which the elements of this indicator are connected in accordance with our invention with the control means of a dual control, direct current, arc welding generator of the split-pole self-excited type. Fig. 3 is a front view of another form of indicator embodying our invention as applied to the control of an arc welding generator of the type illustrated in Fig. 2 and Fig. 4 is a sectional view of the rheostat and tap switch operating mechanism of a controller embodying our invention and having the indicator mechanism shown in Fig. 3.

In accordance with our invention the current output of a dual control generator is selected by scale and pointer means which is responsive to the individual adjustments of the dual controls of the generator. If the dual control generator is an arc welding generator, the indicator scale is graduated in accordance with electrode size and current values for electrode size so that by properly positioning the scale and pointer means of the indicator, the operator may select a current output range of the generator in accordance with electrode size and select a desired current value in the range so selected.

A better understanding of our invention will be obtained from the following description of the two embodiments thereof illustrated in the drawings.

In Fig. 1 we have illustrated one embodiment of our invention by showing the physical structure of the indicator mechanism forming part of the complete apparatus diagrammatically illustrated in Fig. 2.

The apparatus shown in Fig. 2 embodies a direct current source of arc welding current 1 which has been illustrated as a split-pole self-excited generator of the type illustrated and fully described in United States Letters Patent 1,340,004, Sven R. Bergman, May 11, 1920. This generator has an armature 2 provided with main brushes 3 and 4 through which arc welding current is supplied to the work 5 and an arc welding electrode 6 supported in an electrode holder 7.

For certain welding operations it is desirable to have the positive terminal of the generator connected to the work whereas for other welding operations it is desirable to have the positive terminal of the generator connected to the arc welding electrode. In the arrangement shown in Figs. 1 and 2 this selection of polarity is obtained through the agency of a reversing switch 8 operated by a control handle 9. Control handle 9, as shown in Figs. 1 and 2, is in the position for "Straight" polarity, that is, with the positive terminal of the generator connected to the work. If this control handle is moved to the position identified in Fig. 1 as "Reverse," switch 8 will be operated to complete a circuit from the positive terminal of generator 2 to electrode 6 in electrode holder 7.

Generator 1 is also provided with an auxiliary brush 10. One terminal of the self-excited shunt field 11 of generator 1 is connected to this auxiliary brush 10 and the other terminal is connected through a fixed resistance 12, an adjustable resistance 13 and the commutating field 14 of the generator to its main brush 4. Fixed resistance 12 is optional and may be omitted if adjustable resistance 13 is of proper value. The excitation furnished by shunt field 11 is determined by the adjustment of variable resistance 13 obtained by rotating a control handle 15. This control handle is connected by means of a shaft 16 to the movable contact arm 17 of adjustable resistance 13. A dial plate 18 mounted on and having a driving connection with shaft 16 for rotation therewith is provided with five concentric scales 19 graduated in ranges of current value for electrodes of different sizes.

Generator 1 is also provided with a series field 20 selected portions of which are connected in its output circuit through the agency of a tap switch 21. The connections completed through tap switch 21 provide for placing the left end section of series field 20 in the generator output circuit for cumulative excitation and its other four sections in the generator output circuit for differential excitation. The number of series turns and their differential or cumulative connections in the generator's load circuit determine current output ranges of the generator which are selected by each of the five positions of tap switch 21.

This tap switch 21 is moved to any one of its five positions through the agency of an index handle 22 which is connected by a shaft 23 to the blade of tap switch 21. The face plate 24 of the indicating mechanism is provided with five position markers 25 identified by an electrode size or a range of electrode sizes. When the hand grip portion of control handle 22, which, as shown in Fig. 1, is marked "Electrode," is in any one of the positions 25, the pointer portion of this handle, which is marked "Amperes," selects one of the concentric scales 19 of dial 18 having current value graduations corresponding to the range of current values obtainable by the movement of tap switch 21 resulting from the positioning of control handle 22.

Once such an adjustment for current range has been made in accordance with electrode size by movement of control handle 22 to the desired position, any current value in the range of current values thus established may then be obtained by rotation of control handle 15 which adjusts the shunt field rheostat 13 and thereby controls the shunt field excitation of the generator. As handle 15 is turned to accomplish this adjustment, that scale 19 on dial 18 covered by the pointer portion of handle 22 is moved relative thereto to indicate the preset current output of the generator determined by the combined adjustments of the series and shunt fields of the generator accomplished by operation of the dual control handles 15 and 22.

It will be noted that each of the five scales for current output ranges in accordance with electrode size is also identified by the electrode size or the range of electrode size for which this range of current values is suitable. Consequently the position markers 25 on face plate 24 may be omitted if desired since the information necessary for enabling the welding operator to preset the current output of generator 1 in accordance with electrode size is contained on a single dial 18 which is rotatable relative to the index portion of control handle 22 which is movable to five different positions to select any one of the five current range scales 19 on dial 18. It will also be noted, as indicated on the concentric scales 19 of dial 18, that the dual control for generator 1 is constructed and arranged to provide overlapping current output ranges for the different sizes of electrodes. This is a convenient and desirable feature. It will also be noted that as control handle 22 is rotated in a clockwise direction from the position illustrated past each of the electrode positions 25 on face plate 24 the pointer portion of this handle is positioned over scales 19 of dial 18 in the following order: outer scale, middle scale, inner scale, scale between the inner and middle scale, and scale between the middle scale and the outer scale. It is clear that the order of selection may be otherwise depending on the correlation of the several parts of the indicator.

In view of the above description, the operation and use of the equipment illustrated in Figs. 1 and 2 is believed to be obvious. Briefly it is as follows:

The operator connects the welding generator 1 in the welding circuit in accordance with the polarity desired by operating control handle 9 which operates reversing switch 8 to obtain the desired connection. Thereafter in accordance with the electrode size to be employed in the welding operation, the operator moves control handle 22 to that position corresponding with the electrode size to be employed. Movement of this control handle to this position adjusts tap switch 21 so as to provide a current output range for generator 1 which is suitable for the electrode being used in performing the welding operation. Thereafter the operator by turning control handle 15 brings the current setting on that scale 19 of dial 18 which is covered by the pointer portion of handle 22 to the current value at which it is desired to operate the welding generator. Rotation of handle 15 controls the shunt field excitation of generator 1 by adjusting its control rheostat 13. It is thus apparent that by three simple adjustments one of which is for selecting polarity the welding operator can preset the welding apparatus to operate at a desired current value which is within a range determined by the electrode size which he desires to employ in performing this welding operation. Not only is he informed as to the selected range of current values to use with a particular electrode size, but he is enabled to accomplish a setting of the apparatus for a particular current within this range without the aid of the voltmeters and ammeters usually provided with such apparatus for enabling him to accomplish this result.

In Figs. 3 and 4 we have illustrated another embodiment of our invention which differs from that illustrated in Figs. 1 and 2 by the different arrangement of physical parts employed for accomplishing the same purpose. As shown in Fig. 3 the arrangement of the parts of the indicator is different from that illustrated in Fig. 1 and, as illustrated in Fig. 4, the assembly of the tap switch, shunt field rheostat and the operating mechanisms therefor, is different from that illustrated in Fig. 2 although forming part of the same or a like dual control.

In the indicator mechanism illustrated in Fig. 3 the current output range scales 26 are segmental in shape and form part of the face plate 27 of the dual control cabinet structure. Each segmental scale is graduated in current values and identified by the electrode size or range of electrode sizes to be used with said range of current values. It will be noted that each of these scales overlaps the other and has a current range overlapping that of an adjacent scale. Each of these scales is also provided with an index 28 to indicate to the operator that position in which the pointer portion 29 of an index handle 30 is to be located in order to adjust a tap switch, such as 21 of the dual control illustrated in Fig. 2, for obtaining the desired output range of current values from a generator, such as 1 of Fig. 2. When the pointer portion 29 of control handle 30 is opposite any one of the indexes 28 of scales 26, the operator is informed that the tap switch has been operated to a position which will make available a current output range of the generator corresponding to that indicated by the graduations of that scale. A pointer knob 31 is provided for adjusting a shunt field rheostat, such as 13 of the dual control illustrated in Fig. 2, for securing any preset current value in the range of current output values determined by an adjustment of index handle 30. Thus, as illustrated in Fig. 3, the controller has been set by an operation of control handle 30 for current output ranges of from 120 to 240 amperes which is suitable for electrode sizes of $\frac{5}{32}$ to $\frac{3}{16}$ inch and a particular current value of 200 amperes has been selected in this range by the adjustment of pointer knob 31.

As in the arrangements illustrated in Figs. 1 and 2, a control handle 32 is provided for selecting the desired polarity for the welding operation. As in Figs. 1 and 2, this control handle 32 operates a reversing switch connected in the output circuit of the generator in the same manner as the reversing switch 8 of the system illustrated in Fig. 2.

The rheostat and tap switch operating mechanisms of the controller shown in Fig. 3 have been illustrated in Fig. 4. As shown in this figure, the index handle 30 is attached to one end of a hollow shaft 33 to which is also attached the blade 34 of a tap switch 35 having contacts 36. Tap switch 35 is the same or an equivalent of tap switch 21 shown in Fig. 2. A rheostat 37 corresponding to rheostat 13 of Fig. 2 is mounted on the inner end of hollow shaft 33 of tap switch 35. This rheostat is provided with a contact arm 38 mounted on one end of a shaft 39 journaled in hollow shaft 33 which has pointer knob 31 attached to its outer end. Obviously contact arm 38 of rheostat 37 corresponds to contact arm 17 of rheostat 13 of Fig. 2. The assembly as a whole is supported in the control cabinet by means of a bearing 40 within which hollow shaft 33 is supported for rotation. Additional bearings, not shown, may also be provided for adding to the rigidity of this support.

By reason of the arrangement shown in Fig. 4 it is obvious that an adjustment of control handle 30 to adjust tap switch 35 will not only bring pointer portion 29 of this control handle opposite the index of scale 26 giving the range of output current values for this adjustment, but will also carry along shunt field rheostat 37 and pointer knob 31 to this same scale. Thereafter an operation of pointer knob 31 by reason of its driving connection with shaft 39 will enable the operator to select the desired current value in this scale by adjusting contact arm 38 of shunt field rheostat 37. Consequently there is no opportunity afforded the operator for setting pointer knob 31 with regard to a scale not selected by the operation of control handle 30 to determine a desired range of current operating values.

By reason of the description given above, the operation and use of the apparatus illustrated in Figs. 3 and 4 is obvious.

From the above description of two embodiments of our invention, other embodiments thereof will occur to those skilled in the art. Thus for example in Fig. 1, dial 18 may be fixed relative to or form a part of face plate 24 and control handle 15 may be provided with a pointer which can be positioned relative to any of the scales 19 of this dial 18 which has been selected by an operation of control handle 22. Another arrangement may be obtained by mounting a dial plate, such as 18 of Fig. 1, for rotation with a hollow tap switch shaft, and a pointer knob mounted on the rheostat shaft which is journaled for rotation in the tap switch shaft as in Fig. 4 may be employed for selecting current values in any one of the range scales provided by an operation of the tap switch handle. It is of course not necessary to mount the rheostat on the hollow tap switch shaft as in Fig. 4 since an independent mounting may be provided therefor. In such case the pointer portion of the tap switch handle will be provided with a scale indicating electrode size or range of electrode sizes for each of its positions, and a corresponding electrode size identification will be associated with each of the concentric scales of the dial.

Obviously in any modifications of our invention the indicator scales for different current output ranges may be distinctively colored to facilitate identification and use thereof. Furthermore, in an arrangement such as illustrated in Fig. 1 the position markers 25 identified by electrode size may be distinctively colored and the same coloring used for each of the corresponding concentric scales 19 of dial 18; that is, the position marker 25 covered by the hand grip portion of control handle 22 may be colored red and the outer concentric scale 19 of dial 18 also colored red.

It is also apparent that other types of dual control direct current generators than that illustrated and described above may be used without departing from our invention. Also, as stated above, the current adjustments of such generators need not be obtained by a tap switch and rheostat as described in connection with the two embodiments illustrated since a plurality of tap switches, a plurality of rheostats, a plurality of controls for adjusting the reluctances of the magnetic circuits of the generator, a plurality of adjustable potentiometer circuits or a plurality of adjustable shunts which may be either inductive or non-inductive, or any combination of these elements may be used for electrically or magnetically controlling the effective field flux of a dual control generator depending of course on the type of generator employed.

Furthermore the several ranges of arc welding current values determined by an adjustment of the dual control apparatus may be based on some other factor than electrode size and consequently these ranges may be identified by welding terminology which has like significance with respect to the limitations of each of the current ranges such as type of work and heat values. Thus instead of identifying positions of adjustment of one of the control handles of the dual control by electrode size, these positions may be identified in accordance with various degrees of "Heat" such as "High," "Medium," and "Low" or as "Work" with suitable dimensions or ranges of dimensions associated therewith for each range of current values used in welding work of that dimension or range of dimensions.

These and other variations will readily occur to those skilled in the art. Thus, while we have shown and described but two embodiments of our invention, it is apparent that other embodiments thereof will occur to those skilled in the art and we therefore intend to cover by the appended claims all such modifications of our invention as fall within the true spirit and scope thereof.

What we claim as new and desire to secure by Letters Patent of the United States is:

1. Arc welding apparatus comprising a source of arc welding current, an adjustable control means for determining a plurality of overlapping current output ranges for said source of arc welding current, a second adjustable control means for determining the current value of said source of arc welding current for each of the current output ranges determined by said first control means, a plurality of scales each of which is identified by an arc welding electrode size and each of which is graduated in current values for one of said overlapping current output ranges determined by said first mentioned adjustable control means in accordance with said electrode size, a pointer associated with said scales, and means for moving each of said adjustable control means invidually and correspondingly moving said scales and pointer relatively to one another in response to the individual adjustments of each of said control means for selecting said arc welding current output ranges in accordance with electrode size and for adjusting the current value in a current output range selected in accordance with electrode size.

2. Arc welding apparatus comprising a source of arc welding current, an adjustable control means for determining a plurality of current output ranges for said source of arc welding current, a second adjustable control means for determining the current value of said source of arc welding current for the current range determined by said first control means, an index handle movable to a plurality of positions identified by electrode size, means responsive to the movement of said index handle to each of said positions identified by electrode size for adjusting said first mentioned control means for current output ranges of said source of arc welding current corresponding to the electrode sizes indicated at said positions, a plurality of scales each of which is selected by said index handle in accordance with the position to which said handle is moved to determine current output range for electrode size, and means having a driving connection with said second mentioned adjustable control means for moving said scales relatively to said index handle in response to the adjustment of said second mentioned control means to indicate the current value for which said source of arc welding current has been adjusted by operation of both of said control means.

3. Arc welding apparatus comprising a source of arc welding current, control means for determining in accordance with electrode size a plurality of current output ranges for said source of arc welding current, means including an index handle for adjusting said control means for output ranges of said source of arc welding current determined by the position of said handle, means for marking the positions of said handle in accordance with electrode size corresponding to the current output ranges of said source of arc welding current, a plurality of scales each of which is selected by said index handle in one of its said positions, said scales being graduated in current values corresponding to the current range determined by the position of said index handle, a second control means for adjusting the current value of said source of arc welding current within the range determined by an adjustment of said first mentioned control means, means for adjusting said second control means, and a pointer movable over any one of said scales selected by said index lever and operated by movement of said adjusting means for said second control means to indicate on one of said scales selected by movement of said index handle to one of its said positions the current value for which said source of arc welding current has been adjusted by operation of both of said control means.

4. Apparatus comprising a source of current, control means for determining a plurality of current output ranges for said source of current, means including a rotatably supported tubular shaft and a handle mounted thereon for adjusting said control means for output ranges of said source of current determined by the position of said handle, a plurality of scales each of which is selected by a pointer operated by movement of said handle to one of its said positions, said scales being graduated in current values corresponding to the current range determined by the position of said handle, a second control means for adjusting the current value of said source of current within the range determined by an adjustment of said first mentioned control means, means for supporting said second control means on said tubular shaft for rotation therewith, means including a second rotatably supported shaft extending through said tubular shaft and having an operating handle adjacent said first mentioned handle for adjusting said second control means, and a second pointer movable over any one of said scales selected by said first mentioned pointer and operated by rotation imparted to said second shaft by its said operating handle for indicating the current value for which said source of current has been adjusted by operation of said handles of said control means.

5. Arc welding apparatus comprising a source of arc welding current, control means for determining in accordance with electrode size a plurality of current output ranges for said source of arc welding current, means including a rotatably supported tubular shaft and a handle mounted thereon for adjusting said control means for output ranges of said source of arc welding current determined by the position of said handle, a plurality of scales each of which is for electrode sizes corresponding to one of said current output ranges of said source of arc welding current and each of which is selected by a pointer operated by movement of said handle to one of its said positions, said scales being graduated in current values corresponding to the current range for electrodes of predetermined size, a second control means for adjusting the current value of said source of arc welding current within the range determined by an adjustment of said first mentioned control means, means for supporting said second control means on said tubular shaft for rotation therewith, means including a second rotatably supported shaft extending through said tubular shaft and having an operating handle adjacent said first mentioned handle for adjusting said second control means, and a second pointer movable over any one of said scales selected by said first mentioned pointer and operated by rotation imparted to said second shaft by its said operating handle for indicating the current value for which said source of arc welding current has been adjusted by operation of said handles of said adjusting means for said control means.

RAYMOND C. FREEMAN.
RICHARD F. WYER.

REFERENCES CITED

The following references are of record in the file of this patent:

UNITED STATES PATENTS

| Number | Name | Date |
|---|---|---|
| 1,720,446 | Sarazin | July 9, 1929 |
| 2,000,161 | Burgett | May 7, 1935 |
| 2,279,157 | Blakenbuehler | Apr. 7, 1942 |